(12) United States Patent
Dragne

(10) Patent No.: US 12,534,152 B2
(45) Date of Patent: Jan. 27, 2026

(54) DEVICES AND METHODS FOR CONTROLLING THE POWER OF A VEHICLE MOTOR

(71) Applicant: Infineon Technologies AG, Neubiberg (DE)

(72) Inventor: Petru-Valentin Dragne, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 961 days.

(21) Appl. No.: 17/718,831

(22) Filed: Apr. 12, 2022

(65) Prior Publication Data
US 2022/0340223 A1    Oct. 27, 2022

(30) Foreign Application Priority Data
Apr. 22, 2021   (DE) .......................... 102021110321.5

(51) Int. Cl.
| | |
|---|---|
| *B62J 45/413* | (2020.01) |
| *B62J 45/422* | (2020.01) |
| *B62K 23/04* | (2006.01) |
| *B62K 23/06* | (2006.01) |
| *G01B 7/30* | (2006.01) |
| *G01R 33/07* | (2006.01) |

(52) U.S. Cl.
CPC .......... *B62J 45/413* (2020.02); *B62J 45/422* (2020.02); *B62K 23/04* (2013.01); *B62K 23/06* (2013.01); *G01B 7/30* (2013.01); *G01R 33/072* (2013.01); *B62K 2204/00* (2013.01)

(58) Field of Classification Search
CPC ....... B62J 45/413; B62J 45/422; B62K 23/04; B62K 23/06; B62K 2204/00; G01B 7/30; G01R 33/072; G01R 33/0082; G01R 33/0206; G01D 5/145
See application file for complete search history.

(56) References Cited

U.S. PATENT DOCUMENTS

| | | | |
|---|---|---|---|
| 2003/0080732 A1* | 5/2003 | Okazaki | G01D 5/145<br>324/207.2 |
| 2004/0107789 A1* | 6/2004 | Peppard | B62K 23/04<br>74/484 R |

(Continued)

FOREIGN PATENT DOCUMENTS

| | | |
|---|---|---|
| DE | 60120627 T2 | 5/2007 |
| WO | 2005/042306 A2 | 5/2005 |

OTHER PUBLICATIONS

Scott Bryson, TMAG5170-Q1: Linear 3D Hall vs. 1D Hall-effect Sensor, Sep. 20, 2021, Texas Instruments (Year: 2021).*

(Continued)

*Primary Examiner* — Valentin Neacsu
*Assistant Examiner* — Abigail R Hymel
(74) *Attorney, Agent, or Firm* — Harrity & Harrity, LLP

(57) ABSTRACT

A device includes a magnet and a magnetic field sensor configured to sense a magnetic field of the magnet. The magnet and the magnetic field sensor are arranged to be movable relative to each other. A relative movement between the magnet and the magnetic field sensor is based on a movement of a throttle controller of a vehicle. A power provided by a motor of the vehicle correlates to a position of the magnet relative to the magnetic field sensor as sensed by the magnetic field sensor.

19 Claims, 6 Drawing Sheets

(56) References Cited

U.S. PATENT DOCUMENTS

| | | | |
|---|---|---|---|
| 2007/0103149 A1 | 5/2007 | Horie et al. | |
| 2007/0229061 A1* | 10/2007 | Uryu | G01D 5/145 |
| | | | 324/207.25 |
| 2008/0121831 A1* | 5/2008 | Ikeda | G01D 11/245 |
| | | | 324/207.25 |
| 2012/0111137 A1* | 5/2012 | Bliss | B62K 23/04 |
| | | | 74/504 |
| 2013/0255432 A1* | 10/2013 | Nomura | B62K 23/04 |
| | | | 74/504 |
| 2019/0094008 A1* | 3/2019 | Kishi | F02D 11/02 |
| 2020/0018242 A1* | 1/2020 | Kishi | G01B 7/30 |
| 2022/0178312 A1* | 6/2022 | Oshiro | F02D 11/106 |
| 2023/0026992 A1* | 1/2023 | Grohs | G01D 5/145 |

OTHER PUBLICATIONS

Bipolar Hall-Effect Digital Position Sensor ICs, May 2021, Honeywell, Issue C, p. 1 (Year: 2021).*

\* cited by examiner

DEVICES AND METHODS FOR CONTROLLING THE POWER OF A VEHICLE MOTOR

CROSS REFERENCE TO RELATED APPLICATION

This application claims priority to German Patent Application No. 102021110321.5 filed on Apr. 22, 2021, the content of which is incorporated by reference herein in its entirety.

TECHNICAL FIELD

The present disclosure relates to devices and methods for controlling the power of a vehicle motor.

BACKGROUND

Various components may be used for controlling the power of a vehicle motor. For example, the power of a car engine may be controlled by a throttle pedal operated by foot. In a further example, the power of a motorcycle engine may be controlled by a throttle grip operated by hand.

SUMMARY

Some implementations described herein relate to a cost effective and reliable device for controlling the power of a vehicle motor and methods for operating such devices. An aspect of the present disclosure relates to a device. The device comprises a magnet and a magnetic field sensor configured to sense a magnetic field of the magnet. The magnet and the magnetic field sensor are arranged to be movable relative to each other. A relative movement between the magnet and the magnetic field sensor is based on a movement of a throttle controller of a vehicle. A power provided by a motor of the vehicle correlates to a position of the magnet relative to the magnetic field sensor as sensed by the magnetic field sensor.

An aspect of the present disclosure relates to a method. The method comprises moving a magnet and a magnetic field sensor relative to each other, wherein a relative movement between the magnet and the magnetic field sensor is based on a movement of a throttle controller of a vehicle. The method further comprises sensing, by the magnetic field sensor, a magnetic field of the magnet. The method further comprises controlling a power of a motor of the vehicle based on a position of the magnet relative to the magnetic field sensor as sensed by the magnetic field sensor.

BRIEF DESCRIPTION OF THE DRAWINGS

Devices and methods in accordance with the disclosure will be explained in more detail below based on the drawings. Like reference signs may designate corresponding similar parts.

DETAILED DESCRIPTION

Figure 1:
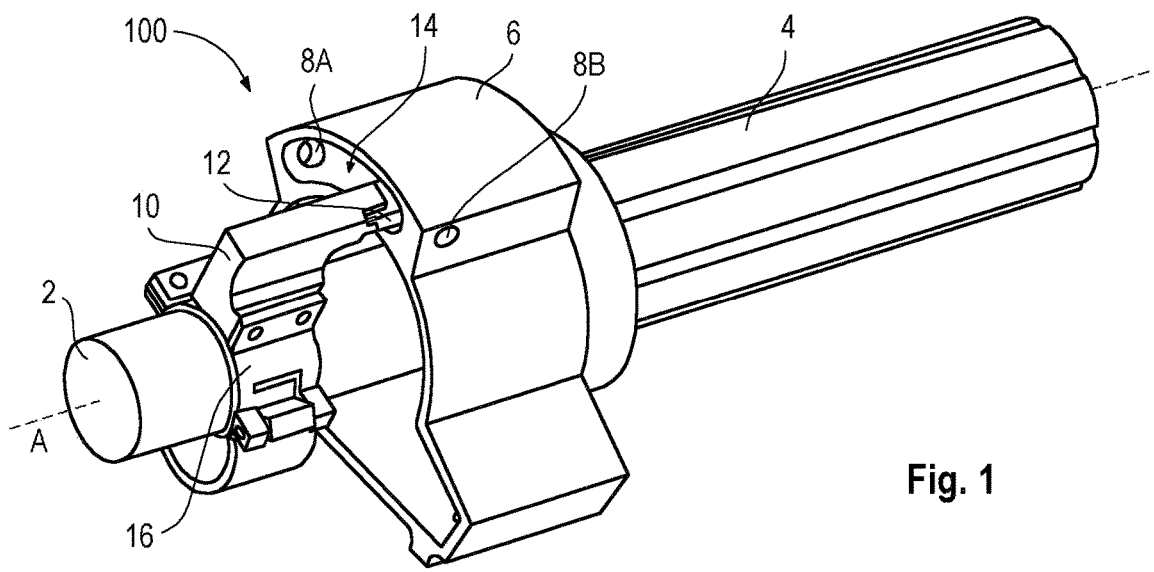
FIG. 1 illustrates a perspective view of a device in accordance with the disclosure in a first position.

FIG. 1 shows a handle bar 2 of a vehicle and a throttle controller 4 arranged on the handle bar 2. In addition, a device 100 may be mounted on the handle bar 2. The device 100 may include a magnet holder 6 configured to hold one or more magnets (not illustrated). For example, the magnets may be arranged in one or more openings 8A, 8B of the magnet holder 6. The device 100 may further include a sensor holder 10 configured to hold a magnetic field sensor 12.

The handle bar 2 may be part of a vehicle. For example, the vehicle may be an electric vehicle such as, for example, an electric bike, an electric scooter, an electric trike, an electric quad bike, etc. The design of the throttle controller 4 may depend on the vehicle type. In the example of FIG. 1, the throttle controller 4 may be a throttle grip (or twist throttle grip) configured to rotate or twist around the handle bar 2 (e.g., around a symmetry axis A of the handle bar 2 (see dashed line)). In a further example (see FIG. 9), a throttle controller of a vehicle may be a throttle lever configured to pivot around a fixing point. The sensor holder 10 may be mechanically coupled to the handle bar 2, for example using a cuff 16 as shown in FIG. 1. The magnet holder 6 may be mechanically coupled to the handle bar 2 as well.

In some implementations, for example as shown in FIG. 1, the sensor holder 10 may be fixed relative to the handle bar 2 to prevent a rotation of the sensor holder 10 and the magnetic field sensor 12 arranged thereon around the handle bar 2. In some implementations, the magnet holder 6 may be rotatable around the handle bar 2. In this regard, the magnet holder 6 may be connected to the throttle grip 4 such that a rotation of the throttle grip 4 around the handle bar 2 may result in a corresponding rotation of the magnet holder 6. In some implementations, the described mobility of the sensor holder 10 and the magnet holder 6 with respect to the handle bar 2 may be inverted. That is, the magnet holder 6 may be fixed relative to the handle bar 2, while the sensor holder 10 may be rotatable around the handle bar 2.

A first magnet and a second magnet (not illustrated) may be arranged in the openings 8A, 8B of the magnet holder 6, respectively. The openings 8A, 8B may be arranged at opposite ends of a cavity 14 formed in the magnet holder 6. An example arrangement of magnets in the openings 8A, 8B of the magnet holder 6 is shown and discussed in connection with FIG. 3. The magnets may extend through the openings 8A, 8B may at least partly protrude into the cavity 14. The magnetic field sensor 12 may be mounted on the sensor holder 10 in such a way that the magnetic field sensor 12 may be arranged in the cavity 14 and may be movable between the magnets.

The magnetic field sensor 12 may e.g. include a Hall sensor (or Hall-IC) having one or more sensor elements implemented in form of one or more Hall elements. The magnetic field sensor 12 may be configured to sense the magnetic field generated by the magnets at the position of the sensor element(s). A detailed design of a magnetic field sensor usable in a device in accordance with the disclosure is shown and discussed in connection with FIG. 4. A rotation of the throttle grip 4 around the handle bar 2 may result in a corresponding rotation of the magnet holder 6 around the handle bar 2. As a result, the position of the magnetic field sensor 12 between the first magnet and the second magnet may change. A position of the magnetic field sensor 12 between the magnets (and thus a position of the throttle grip 4) may be uniquely assignable to a magnetic field strength sensed by the magnetic field sensor 12.

The throttle grip 4 may be configured to control the power of a motor of the vehicle. In some implementations, the motor power may be used to accelerate and drive the vehicle. The vehicle motor may be of any suitable type such as, for example, an electric motor, a combustion motor, etc. The power output of the vehicle motor may be increased (and the vehicle may be accelerated) by clockwise rotating the throttle grip 4. Contrarily, the motor power may be reduced by counterclockwise rotating the throttle grip 4. The rotation of the throttle grip 4 may be restricted between the two extremal positions of the magnetic field sensor 12 at the ends of the cavity 14.

FIG. 1 illustrates a first scenario in which the throttle grip 4 and the magnetic field sensor 12 may be in a first position. The throttle grip 4 is not rotated and the magnetic field sensor 12 is located at the magnet arranged in the second opening 8B. The first position may be associated with a minimum power of the vehicle motor. Note that the term "minimum power" may depend on the considered motor type. For the case of a combustion engine, a minimum power may be configured to maintain an internal combustion of the engine. Such minimum power of a combustion engine may be controlled by an electronic control unit of the vehicle, rather than by a throttle controller operated by the driver. For the case of an electric motor, a minimum power may correspond to an off state of the electric motor. Such off state may be set by the driver keeping the throttle grip in the first position as shown in FIG. 1.

Figure 2:
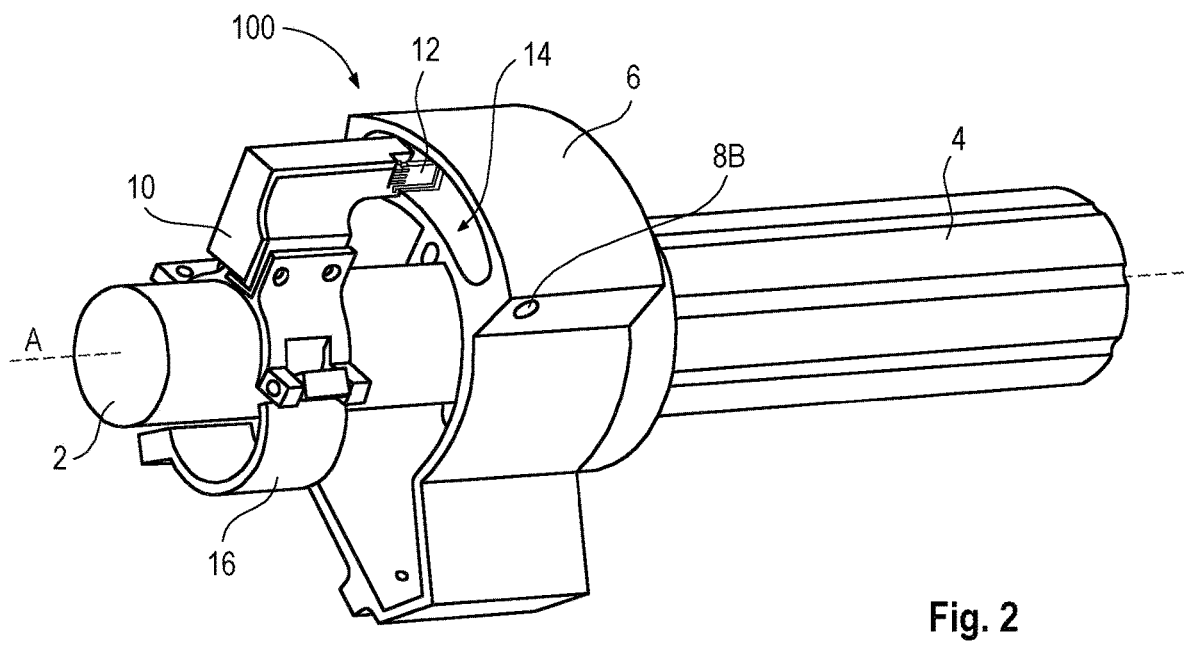
FIG. 2 illustrates a perspective view of the device of FIG. 1 in a second position.

FIG. 2 illustrates a second scenario in which the throttle grip 4 and the magnetic field sensor 12 may be in a second position. Here, the throttle grip 4 has been rotated clockwise to a maximum extent. The magnetic field sensor 12 may be located at the magnet arranged in the first opening 8A. The second position may be associated with a maximum power of the vehicle motor.

During an operation of the vehicle, the driver may rotate the throttle grip 4 depending on the desired acceleration and speed of the vehicle. A rotation of the throttle grip 4 may change the airgaps between the magnets and the magnetic field sensor 12. At any time and position, the magnetic field sensor 12 may sense the magnetic field generated by the magnets at the location of the magnetic field sensor 12. The sensed magnetic field strength may be uniquely assignable to the position of the throttle grip 4. Based on the sensed magnetic field, the magnetic field sensor 12 may generate a sensing signal which may be output to an electronic control unit (not illustrated) of the vehicle. The electronic control unit may be configured to control the power of the vehicle motor based on the sensing signal. In one example, the sensing signal may correspond to an output voltage of the magnetic field sensor 12. The first position of the throttle grip 4 (see FIG. 1) may e.g. result in a minimum output voltage. When calibrating the throttle mechanism, the minimum output voltage may be associated with a minimum throttle. The second position of the throttle grip 4 (see FIG. 2) may e.g. result in a maximum output voltage which may be associated with a maximum throttle. Example transfer functions for mapping a sensed magnetic field strength to an output voltage are shown and discussed in connection with FIGS. 5A-5C.

The cavity 14 and the movement path of the magnetic field sensor 12 between the magnets may have the shape of a circular arc. A total range of movement of the magnetic field sensor 12 between the magnets may be smaller than about 12 mm, more particular smaller than about 11 mm, more particular small than about 10 mm, and even more particular smaller than about 9 mm. Due to the small range of movement, the arc-shaped movement path of the magnetic field sensor 12 may be considered approximately linear. The magnetic field sensor 12 may thus be configured to sense the magnetic field at the location of the magnetic field sensor 12 based on a head-on configuration. A head-on configuration of a magnet and a magnetic field sensor as well as magnetic field components sensed with such head-on configuration are shown and discussed in connection with FIG. 6 and FIGS. 7A-7C.

For safety reasons the throttle grip 4 may be fixed with respect to a movement in an axial direction along the symmetry axis A. That is, the only degree of freedom for the throttle grip 4 may be its rotation around the symmetry axis A. In contrast to this, the magnet holder 6 may optionally be movable in the axial direction. The magnetic field sensor 12 may be configured to detect a change in magnetic field due to a movement of the magnet(s) in the axial direction. In this case, the magnetic field sensor 12 may be a 3D Hall sensor (e.g., a Hall sensor configured to sense magnetic field components of all three spatial directions). Based on a detection of an axial movement, the magnetic field sensor 12 may generate a detection signal. The detection signal may be used as an input signal for an electronic control unit (not illustrated) of the vehicle. The electronic control unit may be configured to trigger an alert or action in response to the detection signal.

For example, a movement of the magnet holder 6 in the axial direction may be based on a behavior or a condition of the driver, such as, for example, a steering behavior. The electronic control unit of the vehicle may receive detection signals from the magnetic field sensor 12 and may detect changes in the steering behavior over the course of the trip based on the detection signals. In this connection, a driver's level of fatigue may be detected in one example. Typical warning signs of decreasing concentration of the driver may be phases during which the driver is barely steering in combination with slight, but quick and abrupt steering movements in order to keep the vehicle on track. Based on such a specific driver behavior pattern, an algorithm may calculate the driver's level of fatigue. For example, the algorithm may be based on or may take into account one or more of: frequency of the detected driver movements, length of the trip, number of frequency use of turn signals, time of day, etc. If the calculated level of fatigue (or the detection signals associated therewith) exceeds one or more predetermined values, the electronic control unit may trigger an alert or action for warning the driver of a potential threat due to his or her fatigue.

A movement of the magnet holder 6 in the axial direction may further be used as an input for an onboard control system which may be operated by the driver of the vehicle. In one example, the driver may control an onboard entertainment system which may include a music player. By moving the magnet holder 6 in the axial direction, a detection signal provided by the magnetic field sensor may trigger the music system to play the previous or the next song of a playlist in one example. In a further example, a movement of the magnet holder 6 in the axial direction may be used for operating the menu of a navigation system.

Figure 3:
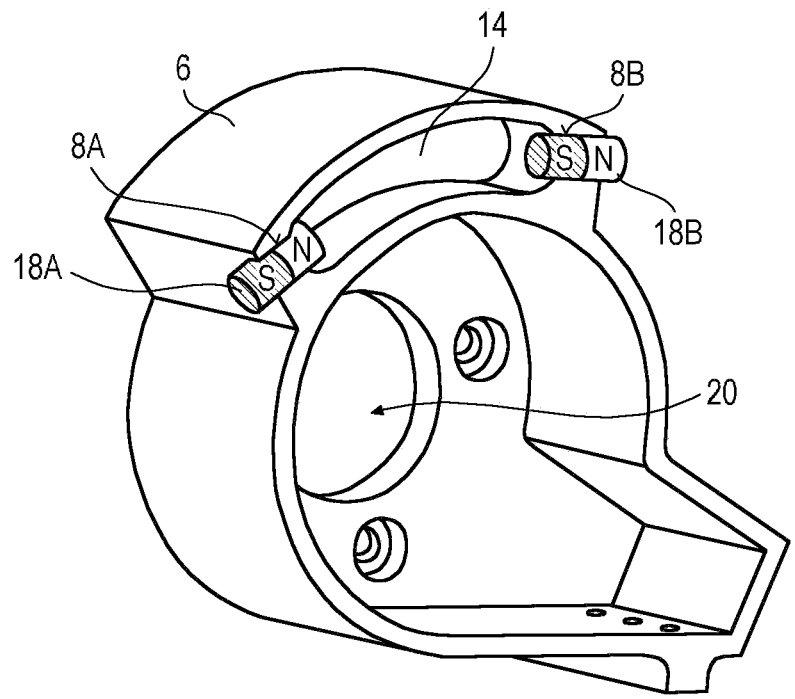
FIG. 3 illustrates a perspective view of a magnet holder which may be part of a device in accordance with the disclosure.

FIG. 3 illustrates a magnet holder 6 which may be similar to the magnet holder 6 of FIGS. 1 and 2. A first magnet 18A and a second magnet 18B may extend through the first opening 8A and the second opening 8B, respectively. In the example of FIG. 3, each of the magnets 18A, 18B may be a bar magnet of cylindrical shape. In the example of FIG. 3, the north pole of the first magnet 18A and the south pole of the second magnet 18B may extend into the cavity 14, respectively. The north pole of the first magnet 18A may thus be arranged opposite to the south pole of the second magnet 18B. In a further example, the poles of each magnet may be inverted such that the south pole of the first magnet 18A may be arranged opposite to the north pole of the second magnet 18B. The magnet holder 6 may include an opening 20 for accommodating the handle bar 2 of the vehicle.

Figure 4:
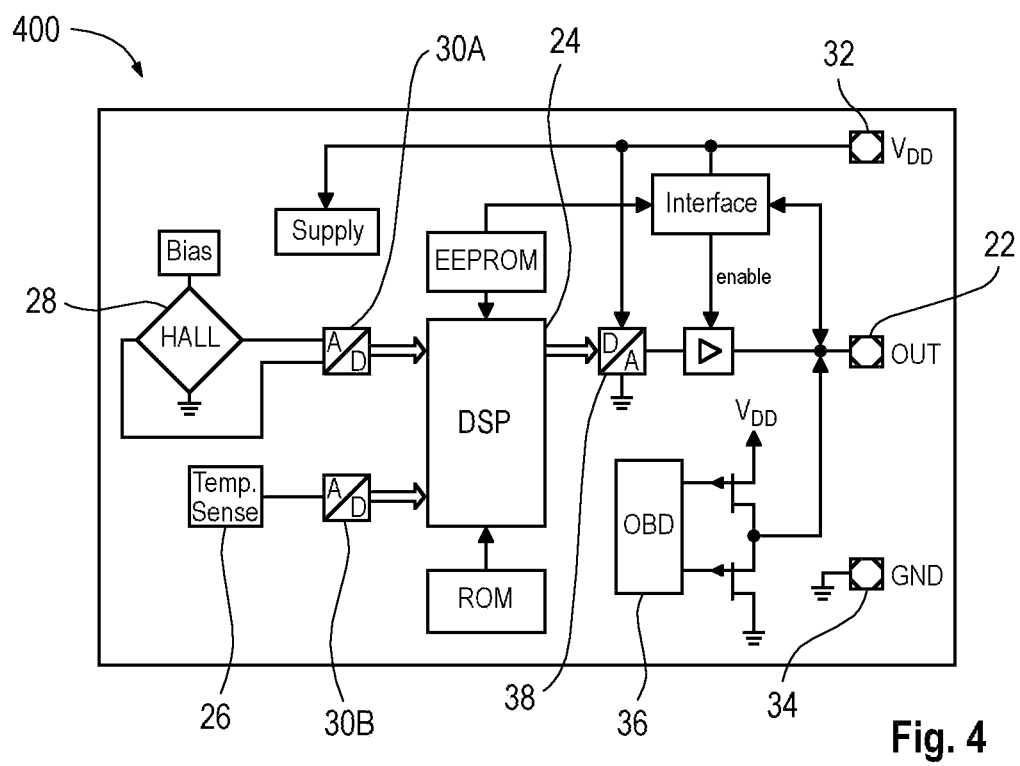
FIG. 4 illustrates a block diagram of a magnetic field sensor which may be part of a device in accordance with the disclosure.

The magnetic field sensor 400 of FIG. 4 may e.g. be used in the device 100 of FIG. 1. In particular, the magnetic field sensor 400 may be similar to the magnetic field sensor 12 of FIG. 1. The magnetic field sensor 400 may include a supply voltage 32 (see $V_{DD}$) of, for example, about 5V, a ground potential 34 which may be connected to circuit ground, and an output 22 for providing a ratiometric analog output voltage (see OUT). The analog output 22 may be connected to an ADC on a motor control unit (MCU) side. For example, the sensor IC may be manufactured in a BiCMOS technology. A digital processing of the sensor IC may be based on a 16-bit DSP 24 architecture. A digital temperature compensation may be provided based on sensing signals of a temperature sensor 26.

The magnetic field sensor 400 may include one or more Hall cells 28 configured to measure a magnetic flux. An output signal of the Hall cell(s) 28 may be converted from analog to digital by an ADC 30A. The noise of the signal may be reduced by a programmable low pass filter. The temperature may be measured by the temperature sensor 26 and may be converted from analog to digital by a further ADC 30B. Temperature compensation may be processed digitally, for example by using a second order function. After digital signal processing performed by the DSP 24, the output value may be converted from digital to analog by a DAC 38. The output voltage provided at the output 22 may be proportional to the supply voltage 32 (see $V_{DD}$). The output voltage range may be clamped by digital limiters. The magnetic field sensor 400 may include an On-Board-Diagnostics (OBD) circuit 36 which may connect the output 22 to a supply voltage or a ground potential in case of occurring errors.

Figure 5A:
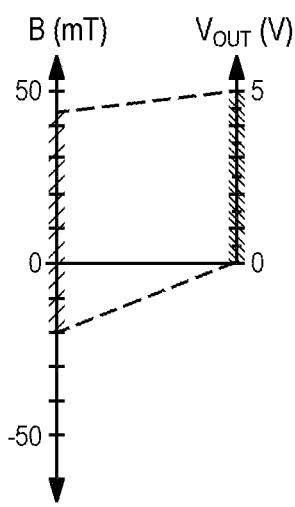
FIGS. 5A-5C illustrate example transfer functions for mapping magnetic field ranges to output voltages.
Figure 5B:
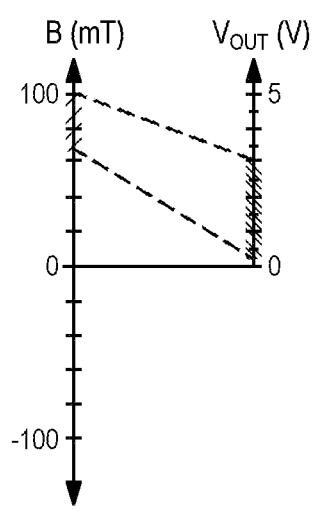
Figure 5C:
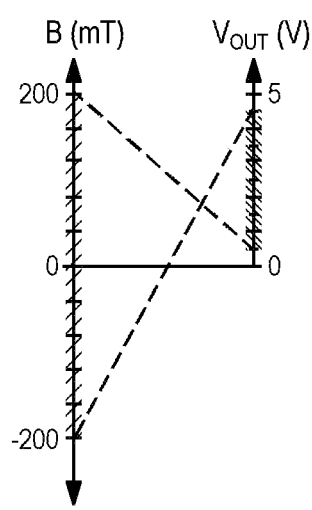

FIGS. 5A-5C illustrate example transfer functions for mapping magnetic field ranges to desired output voltage ranges. Based on such transfer function, a magnetic field strength sensed by a magnetic field sensor may be mapped to an output voltage output by the magnetic field sensor. In each figure, a left vertical axis shows a magnetic field range in units of mT indicated by a hatched area. A right vertical axis shows an output voltage range in units of V indicated by a hatched area. Dashed lines between the vertical axes indicate a mapping of the minimum and maximum magnetic field values to respective output voltages.

In the example of FIG. 5A, a magnetic field range from about −20 mT to about 45 mT may be mapped to an output voltage range from about 0 V to about 5 V. The transfer function of FIG. 5A may be based on a bipolar polarity mode. In a bipolar mode, magnetic fields may be measured in both orientations. The limit points of the magnetic field range do not necessarily have to be symmetrical around the zero field point.

In the example of FIG. 5B, a magnetic field range from about 65 mT to about 100 mT may be mapped to an output voltage range from about 0.2 V to about 3.0 V. The transfer function of FIG. 5B may be based on a unipolar polarity mode. In a unipolar mode, only north- or south-oriented magnetic fields may be measured. The magnetic field range may show a relatively large offset.

In the example of FIG. 5C, a magnetic field range from about −200 mT to about 200 mT may be mapped to an output voltage range from about 0.5 V to about 4.5 V. The transfer function of FIG. 5C may be based on a bipolar mode. The mapping of FIG. 5C may be inverted. That is, the minimum magnetic field value may be mapped to the maximum output voltage while the maximum magnetic field value may be mapped to the minimum output voltage. In some implementations, the magnetic field sensor 12 of FIG. 1 may be a bipolar magnetic field sensor configured to operate in a bipolar mode as shown in FIG. 5C.

Figure 6:
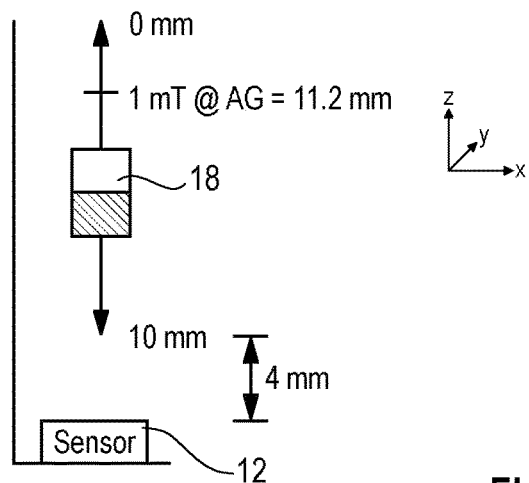
FIG. 6 illustrates a head-on configuration of a magnet and a magnetic field sensor.

FIG. 6 illustrates a head-on configuration of a magnet 18 and a magnetic field sensor 12. A movement of the magnet 18 relative to the magnetic field sensor 12 is indicated by a linear vertical arrow which may e.g. extend along the z-direction. At the upper tip of the arrow, a magnet travelling distance may have a value of about 0 mm, while at the lower tip of the arrow, the magnet travelling distance may have a value of about 10 mm. At the magnet travelling distance of about 10 mm, an air gap between the magnet 18 and the magnetic field sensor 12 may have a value of about 4 mm. At an air gap of about 11.2 mm, the z-component $B_z$ of the magnetic field generated by the magnet 18 may have a value of about 1 mT. For example, the magnetic field sensor 12 may cover a range from smaller than about 1 mT to about 250 mT. Note that the numerical values provided in connection with FIG. 6 are example and in no way limiting.

A linear movement of the magnet 18 in the z-direction may be detected based on the head-on configuration shown in FIG. 6. In the head-on configuration only the B-field of the z-axis may be considered. In this regard, it is to be noted that the arc-shaped movement path of the magnetic field sensor 12 as shown in FIGS. 1 and 2 may be considered approximately linear. That is, the head-on configuration of FIG. 6 may be applied to the scenario of FIG. 1. Since the magnetic field may decrease sharply with distance from the magnet 18, only small magnet travelling distances may be realized in a head-on configuration. A total range of movement of the magnet 18 relative to the magnetic field sensor 12 may be smaller than about 12 mm, more particular smaller than about 11 mm, more particular small than about 10 mm, and even more particular smaller than about 9 mm. In one example, a temperature influence may be canceled out by a microcontroller in order to provide proper position detection.

When sensing the magnetic field strength based on a head-on configuration, the magnetic field sensor 12 may correspond to a 1D Hall sensor, in particular a 1D linear Hall sensor. A 1D linear Hall sensor may be configured to measure one component (here: the z-component) of a magnetic field and output a signal that is directly proportional to the measured magnetic field. A linear Hall sensor may represent a cost effective and reliable solution for measuring the position of the throttle grip 4 and controlling the power of the vehicle motor.

Figure 7A:
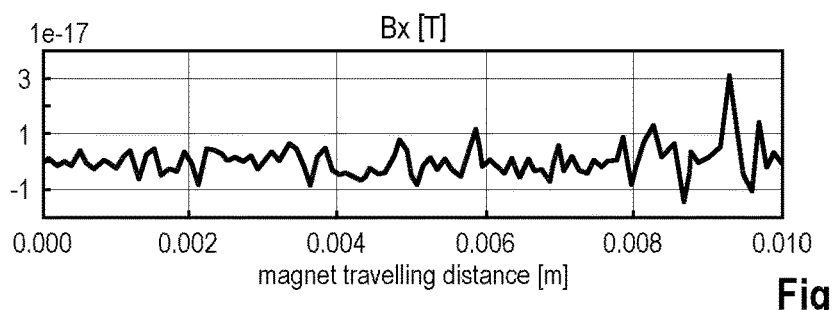
FIGS. 7A-7C illustrate magnetic field components sensed by a magnetic field sensor based on a head-on configuration.
Figure 7B:
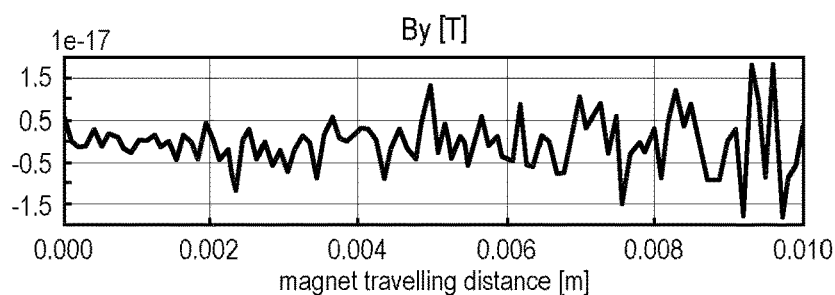
Figure 7C:
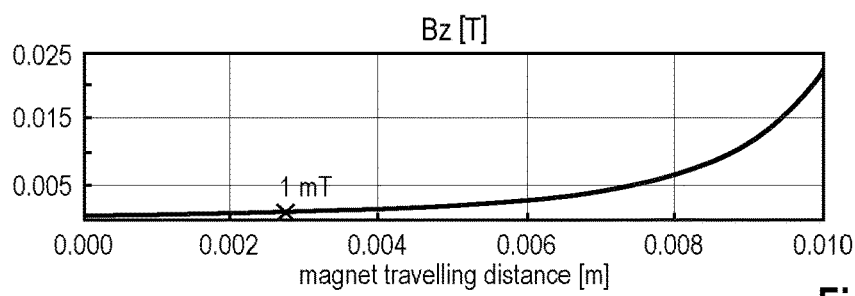

FIGS. 7A-C illustrate magnetic field components sensed by a magnetic field sensor based on a head-on configuration as shown in FIG. 6. In each figure the sensed magnetic field component in units of T is plotted against the magnet travelling distance in units of m.

FIGS. 7A and 7B show that the sensed x-component $B_x$ and y-component $B_y$ of the magnetic field have values of substantially zero. FIG. 7C shows that the sensed z-component $B_z$ of the magnetic field sharply (and in particular exponentially) decreases with decreasing magnet travelling distance. The sensed z-component $B_z$ of the magnetic field having a value of about 1 mT at an air gap of about 11.2 mm is indicated by a cross.

Figure 8:
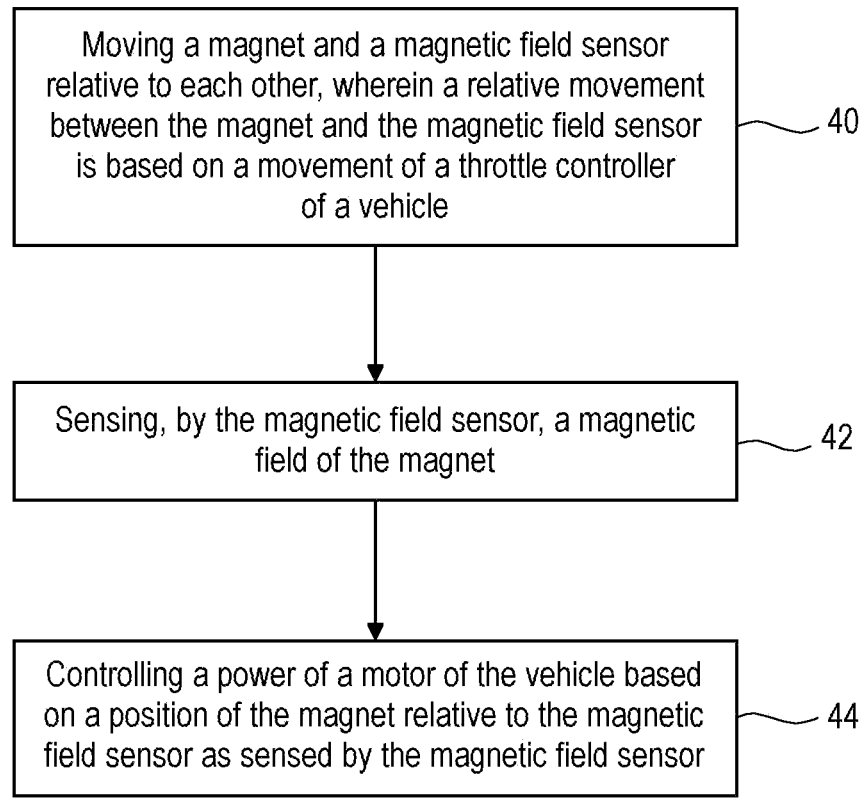
FIG. 8 illustrates a flow chart of a method in accordance with the disclosure.

FIG. 8 illustrates a flow chart of a method in accordance with the disclosure. For example, the method may be used for operating a device in accordance with the disclosure as described herein. The method may thus be read in connection with the foregoing figures.

At 40, a magnet and a magnetic field sensor may be moved relative to each other, wherein a relative movement between the magnet and the magnetic field sensor may be based on a movement of a throttle controller of a vehicle. At 42, a magnetic field of the magnet may be sensed by the magnetic field sensor. At 44, a power of a motor of the vehicle may be controlled based on a position of the magnet relative to the magnetic field sensor as sensed by the magnetic field sensor.

Figure 9A:
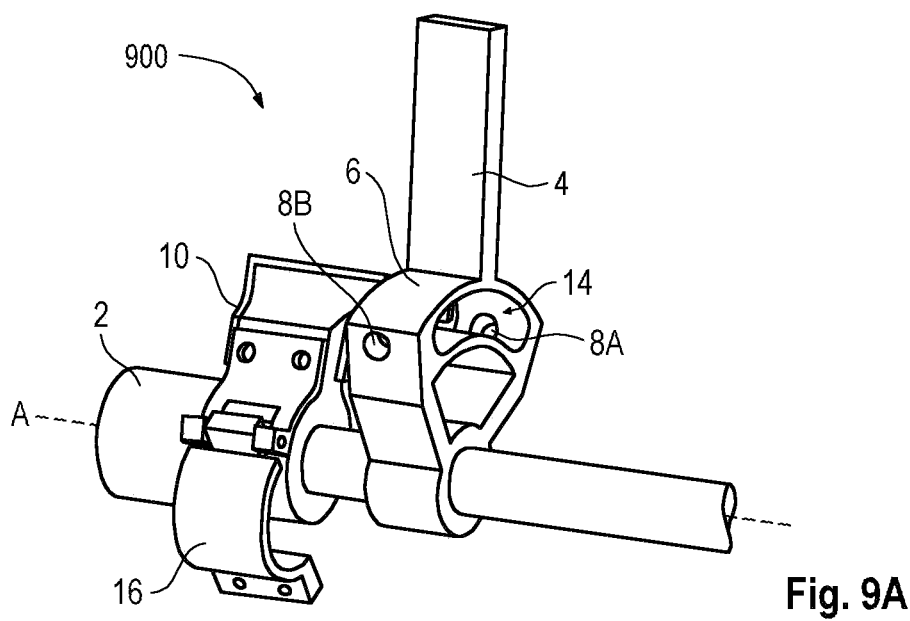
FIGS. 9A-9C illustrate different views of a device in accordance with the disclosure.
Figure 9B:
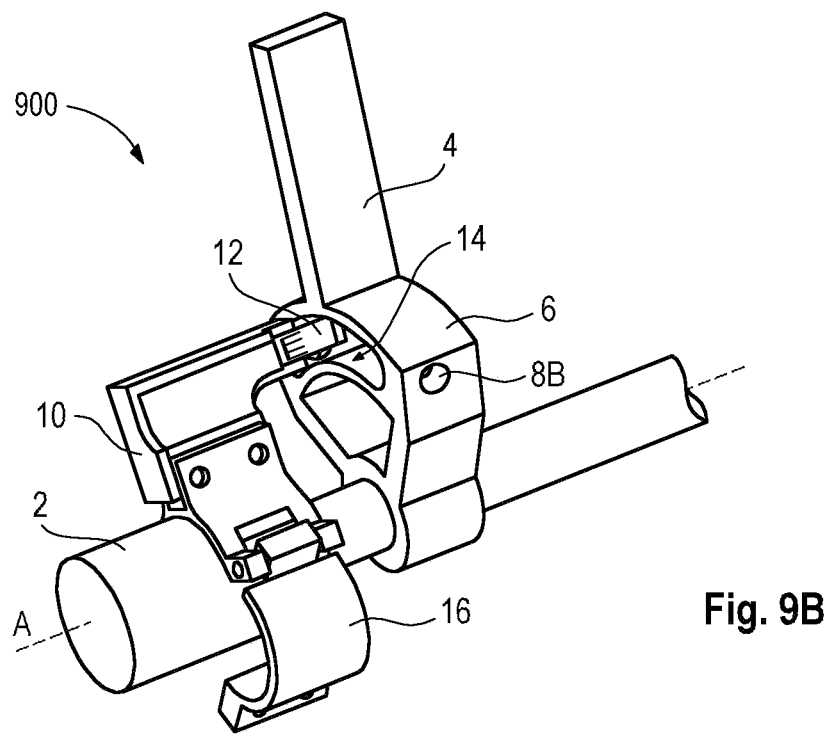
Figure 9C:
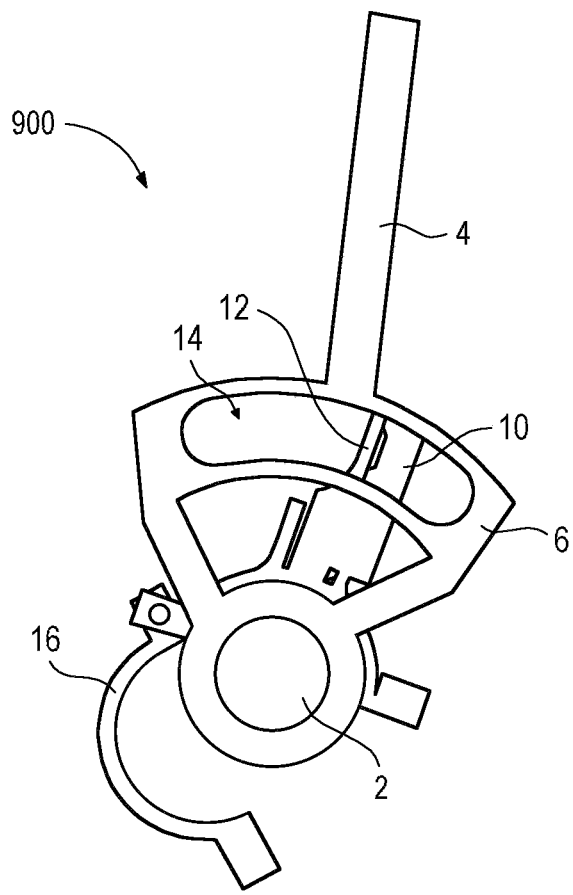

FIG. 9A illustrates a first perspective view of the device 900, FIG. 9B illustrates a second perspective view of the device 900, and FIG. 9C illustrates a cross-sectional side view of the device 900. The device 900 of FIGS. 9A-9C may be similar to the device 100 of FIGS. 1 and 2 and may include similar components. In contrast to FIGS. 1 and 2, the throttle controller of the device 900 may include or may correspond to a throttle lever 4 configured to pivot around a fixing point. The throttle lever 4 may be arranged on the handle bar 2. In the example of FIG. 9, the throttle lever 4 may be arranged at a top surface of the magnet holder 6. In further examples, the throttle lever 4 may be arranged at any other suitable position of the device 900. The magnet holder 6 may be connected to the throttle lever 4 such that a rotation of the throttle lever 4 around the handle bar 2 may result in a corresponding rotation of the magnet holder 6 around the handle bar 2. As a result, the position of the magnetic field sensor 12 between the first magnet and the second magnet may change. The throttle lever 4 may thus be configured to control the power of a motor of the vehicle.

ASPECTS

In the following, devices and methods will be explained using Aspects.

Aspect 1 is a device comprising: a magnet; and a magnetic field sensor configured to sense a magnetic field of the magnet, wherein the magnet and the magnetic field sensor are arranged to be movable relative to each other, wherein a relative movement between the magnet and the magnetic field sensor is based on a movement of a throttle controller of a vehicle, and wherein a power provided by a motor of the vehicle correlates to a position of the magnet relative to the magnetic field sensor as sensed by the magnetic field sensor.

Aspect 2 is a device according to Aspect 1, wherein a position of the throttle controller is uniquely assignable to a magnetic field strength of the sensed magnetic field.

Aspect 3 is a device according to Aspect 1 or 2, wherein the throttle controller comprises a throttle grip configured to rotate around a handle bar of the vehicle.

Aspect 4 is a device according to Aspect 3, further comprising: a magnet holder mechanically coupled to the throttle grip and configured to hold the magnet; and a sensor holder mechanically coupled to the handle bar and configured to hold the magnetic field sensor.

Aspect 5 is a device according to Aspect 4, wherein: the magnet holder is rotatable around the handle bar, and the sensor holder is fixed relative to the handle bar.

Aspect 6 is a device according to Aspect 4 or 5, wherein the magnet holder comprises a cavity and the magnetic field sensor is at least partly arranged in the cavity.

Aspect 7 is a device according to one of the preceding Aspects, wherein the throttle controller comprises a throttle lever configured to pivot around a fixing point.

Aspect 8 is a device according to one of the preceding Aspects, wherein: the magnet comprises a first magnet and a second magnet, and the magnetic field sensor is movable between the first magnet and the second magnet.

Aspect 9 is a device according to Aspect 8, wherein a total range of movement of the magnetic field sensor between the first magnet and the second magnet is smaller than 12 millimeters.

Aspect 10 is a device according to Aspect 8 or 9, wherein a movement path of the magnetic field sensor between the first magnet and the second magnet has the shape of a circular arc.

Aspect 11 is a device according to one of Aspects 8-10, wherein: a first position of the magnetic field sensor at the first magnet is associated with a minimum power of the motor, and a second position of the magnetic field sensor at the second magnet is associated with a maximum power of the motor.

Aspect 12 is a device according to Aspect 4 and Aspect 8, wherein: the magnet holder includes a first opening and a second opening, and the first magnet is arranged in the first opening and the second magnet is arranged in the second opening.

Aspect 13 is a device according to one of the preceding Aspects, wherein the magnetic field sensor is configured to: generate a sensing signal based on the sensed magnetic field, and output the sensing signal to an electronic control unit of the vehicle, wherein the electronic control unit is configured to control the power of the motor based on the sensing signal.

Aspect 14 is a device according to one of the preceding Aspects, wherein the magnetic field sensor is configured to sense the magnetic field of the magnet based on a head-on configuration.

Aspect 15 is a device according to Aspect 14, wherein the magnetic field sensor is a 1D Hall sensor.

Aspect 16 is a device according to one of the preceding Aspects, wherein the magnetic field sensor is a bipolar magnetic field sensor.

Aspect 17 is a device according to Aspect 4, wherein: the magnet holder is movable in an axial direction of the handle bar, and the magnetic field sensor is configured to detect a change in magnetic field due to a movement of the magnet in the axial direction of the handle bar and to generate a detection signal based on the detection.

Aspect 18 is a device according to Aspect 17, wherein the detection signal is based on a behavior or a condition of a driver of the vehicle.

Aspect 19 is a device according to Aspect 17, wherein: the detection signal is configured as an input signal for an electronic control unit, and the electronic control unit is configured to trigger an alert or an action in response to a detection signal associated with a specific driver behavior pattern.

Aspect 20 is a device according to one of Aspects 17-19, wherein the magnetic field sensor is a 3D Hall sensor.

Aspect 21 is a device according to one of the preceding Aspects, wherein the vehicle is one of an electric bike, an electric scooter, an electric trike, or an electric quad bike.

Aspect 22 is a method, comprising: moving a magnet and a magnetic field sensor relative to each other, wherein a relative movement between the magnet and the magnetic field sensor is based on a movement of a throttle controller of a vehicle; sensing, by the magnetic field sensor, a magnetic field of the magnet; and controlling a power of a motor of the vehicle based on a position of the magnet relative to the magnetic field sensor as sensed by the magnetic field sensor.

While this implementation has been described with reference to illustrative implementations, this description is not intended to be construed in a limiting sense. Various modifications and combinations of the illustrative implementations, as well as other implementations of the implementation, will be apparent to persons skilled in the art upon reference of the description. It is therefore intended that the appended claims encompass any such modifications or implementations.

The invention claimed is:

1. A device, comprising:
   a first magnet;
   a second magnet; and
   a magnetic field sensor movable between the first magnet and the second magnet such that the magnetic field sensor is movable relative to the first magnet and the second magnet, wherein the magnetic field sensor is configured to sense a magnetic field provided by at least one of the first magnet and the second magnet,
   wherein a relative movement between the magnetic field sensor and the first magnet and a relative movement between the magnetic field sensor and the second magnet is based on a movement of a throttle controller of a vehicle, and
   wherein a power provided by a motor of the vehicle correlates to a position of the magnetic field sensor relative to the first magnet and the second magnet as sensed by the magnetic field sensor.

2. The device of claim 1, wherein a position of the throttle controller is uniquely assignable to a magnetic field strength of the magnetic field.

3. The device of claim 1, wherein the throttle controller comprises a throttle grip configured to rotate around a handle bar of the vehicle.

4. The device of claim 3, further comprising:
   a magnet holder mechanically coupled to the throttle grip and configured to hold the first magnet and the second magnet; and
   a sensor holder mechanically coupled to the handle bar and configured to hold the magnetic field sensor.

5. The device of claim 4, wherein:
   the magnet holder is rotatable around the handle bar, and
   the sensor holder is fixed relative to the handle bar.

6. The device of claim 4, wherein the magnet holder comprises a cavity and the magnetic field sensor is at least partly arranged in the cavity.

7. The device of claim 4, wherein:
   the magnet holder includes a first opening and a second opening, and
   the first magnet is arranged in the first opening and the second magnet is arranged in the second opening.

8. The device of claim 4, wherein:
   the magnet holder is movable in an axial direction of the handle bar, and
   the magnetic field sensor is configured to detect a change in magnetic field due to a movement of the first magnet and the second magnet in the axial direction of the handle bar and to generate a detection signal based on the change in the magnetic field.

9. The device of claim 8, wherein the detection signal is based on a behavior or a condition of a driver of the vehicle.

10. The device of claim 8, wherein:
    the detection signal is configured as an input signal for an electronic control unit, and
    the electronic control unit is configured to trigger an alert or an action in response to a detection signal associated with a specific driver behavior pattern.

11. The device of claim 8, wherein the magnetic field sensor is a 3D Hall sensor.

12. The device of claim 1, wherein a total range of movement of the magnetic field sensor between the first magnet and the second magnet is smaller than 12 millimeters.

13. The device of claim 1, wherein a movement path of the magnetic field sensor between the first magnet and the second magnet has a shape of a circular arc.

14. The device of claim 1, wherein:
    a first position of the magnetic field sensor at the first magnet is associated with a minimum power of the motor, and
    a second position of the magnetic field sensor at the second magnet is associated with a maximum power of the motor.

15. The device of claim 1, wherein the magnetic field sensor is configured to:
    generate a sensing signal based on the magnetic field, and
    output the sensing signal to an electronic control unit of the vehicle, wherein the electronic control unit is configured to control the power of the motor based on the sensing signal.

16. The device of claim 1, wherein the magnetic field sensor is configured to sense the magnetic field provided by at least one of the first magnet and the second magnet based on a head-on configuration.

17. The device of claim 16, wherein the magnetic field sensor is a 1D Hall sensor.

18. The device of claim 1, wherein the magnetic field sensor is a bipolar magnetic field sensor.

19. A method, comprising:
    moving a magnet and a magnetic field sensor relative to a first magnet and a second magnet, wherein the magnetic field sensor is movable between the first magnet and the second magnet, wherein a relative movement between the magnetic field sensor and the first magnet and a relative movement between the magnetic field sensor and the second magnet is based on a movement of a throttle controller of a vehicle;
    sensing, by the magnetic field sensor, a magnetic field provided by at least one of the first magnet and the second magnet; and
    controlling a power of a motor of the vehicle based on a position of the magnetic field sensor relative to the first magnet and the second magnet as sensed by the magnetic field sensor.

* * * * *